No. 821,320. PATENTED MAY 22, 1906.
M. H. TUPPER.
FOLDING BRUSH.
APPLICATION FILED JUNE 7, 1905.
2 SHEETS—SHEET 1.
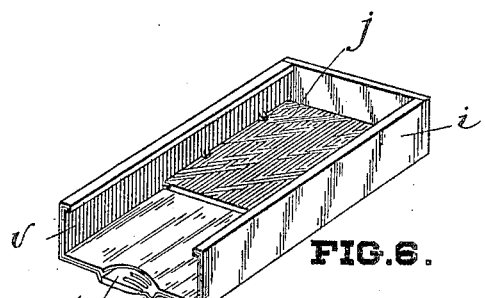
FIG. 6.
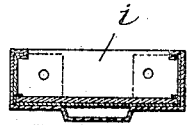
FIG. 7.
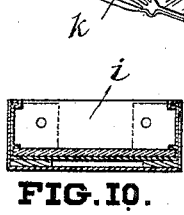
FIG. 10.
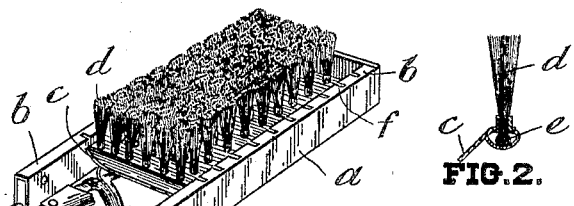
FIG. 1. FIG. 2.
FIG. 3.
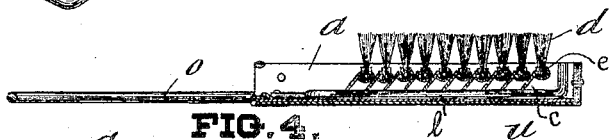
FIG. 4.
FIG. 5.
FIG. 12.
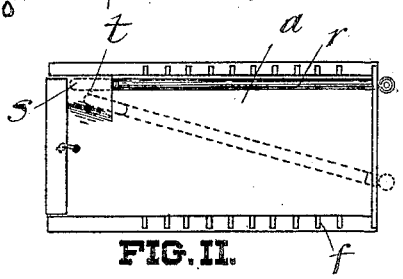
FIG. 11.
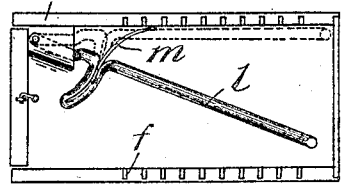
FIG. 8.
WITNESSES
W. A. Wyman.
J. H. Glenn.
INVENTOR
M. H. Tupper
BY
Atty No. 821,320. PATENTED MAY 22, 1906.
M. H. TUPPER.
FOLDING BRUSH.
APPLICATION FILED JUNE 7, 1905.

2 SHEETS—SHEET 2.

WITNESSES.
J. H. Glen.
W. G. Wyman.

INVENTOR.
M. H. Tupper.

BY.
Fred Falustinbaugh
Atty.

UNITED STATES PATENT OFFICE.

MELBURN HORACE TUPPER, OF BUDA, CANADA.

FOLDING BRUSH.

No. 821,320.  Specification of Letters Patent.  Patented May 22, 1906.

Application filed June 7, 1905. Serial No. 264,048.

*To all whom it may concern:*

Be it known that I, MELBURN HORACE TUPPER, telegraph operator, residing at Buda, in the district of Algoma, Province of Ontario, Dominion of Canada, have invented certain new and useful Improvements in Folding Brushes, of which the following is a specification.

My invention relates to improvements in folding brushes; and the objects of my invention are to devise an improved folding brush of the type in which the bristles are all secured in movable holders in such a manner that when the cover is removed from the brush the bristles may be brought into the upright position and when the cover is placed on the brush the bristles will be turned downwardly, further objects being to provide means on the device for holding a comb and mirror, both of which may be used at the same time as the brush and to provide convenient means for removing the bristles during cleaning; and it consists, essentially, of a suitable framework or casing having a plurality of bristles supporting cross-pieces pivotally held in the sides of the frame, a rod located beneath said cross-pieces, means whereby said cross-pieces will be caused to remain normally in a substantially horizontal position, and means whereby they may be turned and the bristles brought to a substantially vertical position by the operation of the above-mentioned rod, which acts substantially as a cam on the edge of the cross-pieces, the various parts of the device being constructed and arranged in detail, as hereinafter more particularly described.

Figure 17:
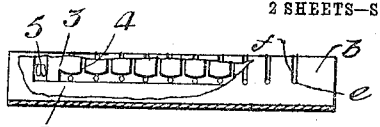
Figure 9:
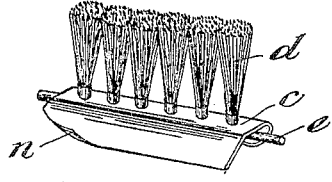
Figure 18:
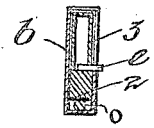
Figure 14:
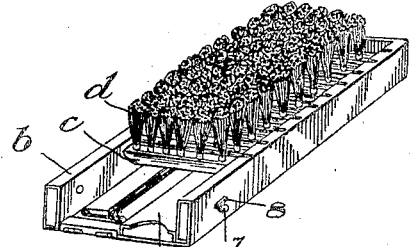
Figure 15:
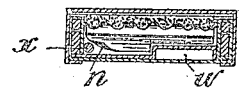
Figure 16:
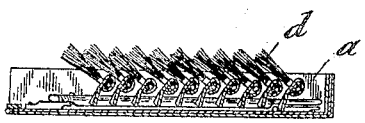
Figure 19:
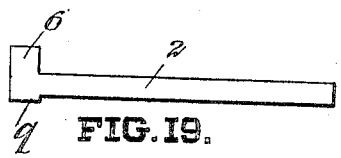
Figure 13:
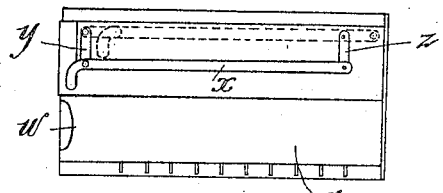
Figure 20:

Figure 1 is a general perspective view of the brush. Fig. 2 is a detail of one of the bristle-carriers or cross-pieces. Fig. 3 is a cross-section through the brush. Fig. 4 is a longitudinal section through the same. Fig. 5 is a side view of a slotted bar which may be used as an alternative means for receiving the ends of the pivots. Fig. 6 is a perspective view of the cover. Fig. 7 is a sectional view thereof. Fig. 8 is a plan view of the frame, showing the locking-rod and spring therefor. Fig. 9 is a perspective detail of one of the cross-pieces carrying the bristles. Fig. 10 is a cross-sectional view of an alternative form of the cover. Fig. 11 is an alternative form of locking-rod shown in place in the frame. Fig. 12 is an end view of the frame, showing the end of this form of locking-rod protruding therefrom. Fig. 13 is a second alternative form of locking-rod. Fig. 14 is a perspective view of the main body of the brush with the alternative form of rod as shown in Fig. 13. Fig. 15 is a transverse section through the device shown in Fig. 14. Fig. 16 is a longitudinal section through the same. Fig. 17 is a side view of the inside of the said device, a portion thereof being broken away to show the device for removably securing the bristle-carrying cross-pieces in place. Fig. 18 is a section through the same. Fig. 19 is a plan of the bar 2, on which the pivotal rods on the ends of the cross-pieces rest. Fig. 20 is a perspective view of the vertically-slotted bar 3.

In the drawings like characters of reference indicate corresponding parts in each figure.

Referring now to Figs. 1 to 9, inclusive, $a$ is the frame or body of the device, which is made, preferably, of light sheet metal bent to form the double sides $b\ b$. $c$ represents cross-pieces having bristles $d$ suitably secured thereon. Each of these cross-pieces is adapted to be pivotally supported by the inner side walls of the body of the device in such a manner that the bristles are capable of all turning downwardly when the cover is placed on the device and of being returned to their upright position when the cover is removed. To accomplish this end, I provide a pivotal support $e$ for the cross-pieces, which extends into suitable bearings formed in the side walls. These bearings may be formed simply by making properly-placed holes in the side walls; but the device which I find preferable is as follows: Slots $f$ are cut in the side walls, and through these slots the pintles or rods $e$ extend to the interior of the hollow side wall. A bar 2 slides in the space in the hollow side walls, and the ends of the pintles $e$ are adapted to rest thereon. A bar 3, provided with a plurality of vertical slots 4, in number corresponding to the slots in the side wall, is slidably supported on top of the bar 2 and normally resiliently held in position by a suitable spring 5, which abuts one end of it and an extension 6 on the bar 2. The slots 4 in the bar 3 need not extend wholly through the bar, but only a sufficient distance to receive the ends of the pintles, as shown in Fig. 20. A pin or button 7 is secured to the slidable bar 3 and extends through a slot 8 in the side of the case, whereby the slotted bar 3 may be moved longitudinally by means of the button. Under normal conditions the slotted bar 3 is in position as shown in Fig. 17, the slots thereof being approximately midway between the slots in the side walls, the bottom of the bar between the slots resting on top of the pintles e and serving to hold them rotatably in position.

When it is desired to remove the bristles for any reason whatever, the slotted bar 3 is moved longitudinally until the slots in it come in alinement with those in the side walls, when the bristle-carrying cross-pieces may be lifted directly out of the bars. By this means the bristles may at any time be very readily removed and cleaned.

As an alternative means for retaining the cross-pieces rotatably in position I may use the slotted bar g, (shown in Fig. 5,) which is adapted to slide in the space in the hollow side walls, and the slot h therein is adapted to engage the ends of the pintles e and hold them rotatably in position. It will thus be seen that the cross-pieces are capable of turning on their pivoted ends, and I will now describe one of the means for causing this action to take place.

Referring first to Fig. 6, i is the cover, which is adapted to slide over the body of the brush and in doing so is adapted to force down the bristles into the substantially horizontal position. This cover, it may here be mentioned, contains or may contain a mirror j, suitably secured therein, and a comb k in a recess constructed in any suitable manner.

Referring to Fig. 9, the end of each cross-piece is provided with a peculiar cam-curve n, which engages the rod l, (shown in Fig. 8,) and this curve is of such a form that when the rod l is moved from the position shown in dotted lines in Fig. 8 to that in full the bristles will be raised to a vertical position and securely locked therein. This motion is caused to take place by a suitably-located spring m. When it is desired to close the brush, the rod may be forced back into the position shown in dotted lines and held there by the thumb while the cover is placed on the device, thereby forcing the bristles to remain down. A handle o is provided and extends inwardly through the hollow side walls of the device beneath the bar 2. The inner ends of this handle are turned upwardly, as shown at p, and when the handle is pulled these upwardly-turned portions engage the shoulders q of the bars 2 to prevent the handle coming out entirely. Where the slotted bar g is used, the same construction may be used as shown in Fig. 5.

Referring now to Fig. 11, in this drawing an alternative device for rotating the bristle-carriers is shown consisting of the rod r, which has an inner end s, preferably flattened to occupy less space, which extends into a recess t, formed in the bottom of the body or frame and is loosely held therein. The outer end extends through a slot u in the end of the frame, and this slot engages a groove in the end of the rod, and thus the rod is capable of having its ends r moved from side to side of the end of the frame, while the inner end remains practically stationary, and thus an alternative means is provided for raising the bristles and locking them in position when raised. When the cover is to be placed on the brush, the rod may be readily returned from the position shown in dotted lines in Fig. 11 to the position shown in full lines. It may here be mentioned that the cover is preferably provided with a lining v, of material such as celluloid or the like, for the purpose of keeping the same absolutely clean. This lining may be secured in the cover by any suitable means, such as the overlapping edges indicated in Fig. 6.

Referring now to Figs. 14, 15, 16, I have here shown a form of the device in which the comb-receptacle is in the body of the brush. This construction necessitates a different arrangement of locking-rod, as the forms shown in Figs. 1 and 11 could not operate, but would be blocked by the raised portion of the comb-receptacle w. I therefore provide a locking-rod x, pivotally secured to two swinging links y and z, respectively, these links being pivoted to the bottom of the casing. It will thus be seen that this rod in moving from the position shown in dotted lines, Fig. 13, to the position shown in full lines, will accomplish the same object as the rods shown in Figs. 8 and 11. If desired, this rod may be provided with a spring, or it may be operated by hand when the cover is removed.

It will now be seen that I have devised an extremely useful article which may be used as a brush and is also provided with a mirror, a comb, and a convenient handle, all combined in such a way as to be compact and rapidly adjustable for use.

What I claim as my invention is—

1. In a device of the class described the combination with a substantially box-shaped body having the sides formed of a double thickness with an interior hollow portion, of the cross-pieces extending into slots formed in the inner portions of said side pieces, bars adapted to slide in between the walls of said hollow sides and support the ends of the pivotal rods, vertically-slotted resiliently-held bars fitting in the hollow portion in the side walls and adapted to coact with the slotted walls to removably retain the pivotal rods in position as and for the purpose specified.

2. In a device of the class described the combination with the substantially box-shaped body having the sides formed of a double thickness with an interior hollow portion, of the cross-pieces extending into slots formed in the inner portions of said side pieces, bars adapted to slide in between the walls of said hollow sides and support the ends of the pivotal rods, vertically-slotted bars slidably supported on the top of said bars and adapted to coact with the slotted walls to normally retain the pivotal rods in position, a spring resiliently holding said rod in position and a button extending through a slot in the casing for moving the said slotted bar longitudinally and releasing the cross-pieces thereof as and for the purpose specified.

3. In a device of the class described the combination with the body, of the cross-pieces formed of sheet metal secured to suitable rods, said cross-pieces each having one corner chamfered off and curved upwardly, of a rod located in the bottom portion of the body in the space formed by said chamfered portions when the bristles and cross-pieces are turned into the desired position and means whereby said rod may be moved laterally in relation to the body thereby engaging the chamfered corners of the cross-pieces and forcing the bristles into the substantially vertical position as and for the purpose specified.

4. In a device of the class described the combination with the body, the cross-pieces rotatably mounted in the sides of the body and the bristles carried thereby, of a rod located in the bottom of the body and spring means for causing said rod to rotate the cross-pieces and bring and hold them in an upright position therein as and for the purpose specified.

Signed at Fort William, in the Province of Ontario, this 2d day of June, 1905.

MELBURN HORACE TUPPER.

Witnesses:
J. HORACE NULAND,
J. FRANK THOMSON.